S. L. ALLEN.
CULTIVATOR.
APPLICATION FILED FEB. 23, 1918.
1,304,926.
Patented May 27, 1919.
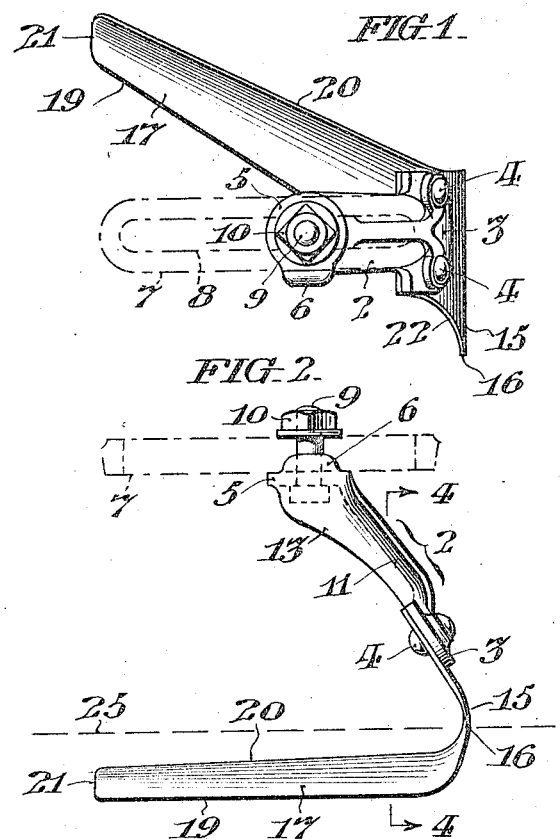
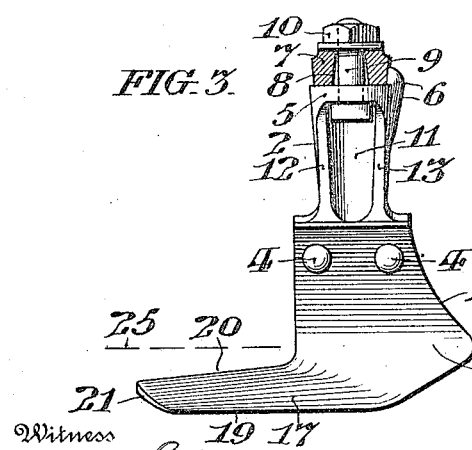
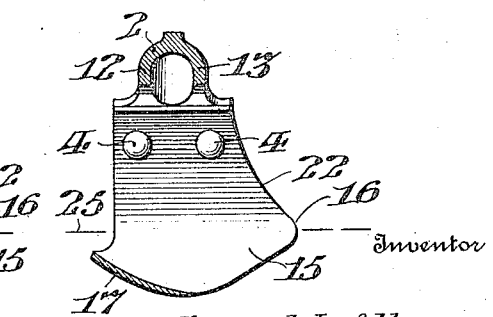
Witness
H. J. Gibson
Inventor
Samuel L. Allen,
By Clifton C. Callowes
Attorney

UNITED STATES PATENT OFFICE.

SAMUEL L. ALLEN, OF MOORESTOWN, NEW JERSEY, ASSIGNOR TO S. L. ALLEN & CO., A FIRM COMPOSED OF SAMUEL L. ALLEN, WILLIAM H. ROBERTS, AND ELIZABETH H. RICHIE.

CULTIVATOR.

1,304,926.      Specification of Letters Patent.      Patented May 27, 1919.

Application filed February 23, 1918. Serial No. 218,662.

*To all whom it may concern:*

Be it known that I, SAMUEL L. ALLEN, a citizen of the United States, residing at Moorestown, in the county of Burlington, State of New Jersey, have invented certain new and useful Improvements in Cultivators, of which the following is a specification, reference being had to the accompanying drawing.

My invention relates particularly to that class of cultivator tools, which are adapted for shallow cultivation, having the effective portion of the blade disposed horizontally, and arranged to mulch the upper soil, while leaving the surface substantially level, and is especially directed to the form of said blade and its support.

The principal objects of my invention are, to provide a cultivator tool of simple construction, which not only affords maximum strength, but which is so mounted as to permit its unretarded movement through the soil.

Other objects of my invention are to provide a cultivator blade having a mounting or bracket whose point of support is in a longitudinal plane, substantially approximating the center of the width of the blade, with respect to its direction of travel, to provide said bracket with an abutment for engaging its support, thereby affording rigidity with a lightened construction, and to provide a blade having its soil raising wing dished in the direction of its travel.

Specifically stated the form of my invention as hereinafter described, comprehends a cultivator tool having a mounting, comprising a cast standard or bracket having a head provided with a lug or lip arranged to engage its support, and having a shank depending obliquely downward and integrally connected with the upwardly inclined end of the blade, formed of sheet steel, and comprising a forwardly broadened under-curved shield, merging into a substantially horizontal soil lifting wing extending obliquely backward, inclining rearwardly upward, curving longitudinally in the direction of travel and tapering laterally toward its free edge.

My invention also includes all of the various novel features of construction and arrangement as hereinafter more definitely specified.

In the accompanying drawings, Figure 1, is a plan view of a cultivator tool constructed in accordance with my invention; Fig. 2, is a front elevational view of the cultivator tool shown in Fig. 1; Fig. 3, is a side elevational view of said cultivator tool, as viewed from the left of Figs. 1 and 2; and Fig. 4, is a sectional view of the cultivator tool taken on the line 4—4, in Fig. 2.

In said figures the blade, which is preferably formed of sheet steel, is carried by the standard or bracket 2, to the ear 3, at the lower end of which it is rigidly secured by rivets 4. Said bracket 2 has the head 5, provided with the lug or lip 6, forming a shoulder and providing an abutment extending transversely and arranged to engage the forward edge of the supporting frame 7, having the slot 8, of any suitable carrier, as shown in dot and dash lines in Figs. 1 and 2, and in full lines in Fig. 3; said head being adjustably held in position by the screw-bolt 9 and nut 10, as is best shown in Fig. 3.

The head 5 and ear 3 of the bracket 2 are connected by the laterally disposed, obliquely depending shank 11, which as shown in Figs. 3 and 4, may preferably be hollow, having the flanges 12 and 13, arranged to reinforce or brace said bracket, in opposition to any lateral strains to which it may be subjected.

The blade comprises the shield 15, which continues downwardly and outwardly, substantially in alinement with the shank 11 of the bracket 2, and which broadens forwardly to form the point or nose 16, and curves under, merging into the substantially horizontal wing 17, which extends obliquely backward, curves upwardly from its sharpened edge 19, and tapers laterally toward its free lateral edge 21.

The blade is so disposed with relation to the bracket 2, that the forward sharpened edge 19 of its effective wing 17 travels in a plane substantially parallel with the horizontal surface of the ground, while the rear edge 20 travels in a plane declining from the shield 15, toward the free edge of the blade wing. Thus it will be seen that when tools of right and left construction are mounted upon a carrier, with the shields in juxtaposition, and disposed upon opposite sides of the row of plants being cultivated, the soil nearest the plants will be loosened to a somewhat greater extent than the soil at the extreme free edge of the blade wing 17. This while having the effect of leaving the surface of the soil substantially level, will tend to effect the desired slight inclination toward the row of plants being cultivated.

The upward curve in the blade wing 17 has a dual purpose, as it not only serves to prevent bending of said wing, but also serves to permit the blade being progressed through the soil with less energy than if it were simply inclined, as is common in such blades, as it first cuts and loosens the soil in a substantially horizontal path and then scoops the loosened soil from the undisturbed soil below.

The curve of the blade wing 17 is carried well up into the under-curved portion of the shield 15, thus adequately stiffening the shield at its narrowed region of merger with said wing 17, from which region it broadens forwardly to form the nose 16, as above described. The nose 16 both indicates the depth to which the blade should be sunk into the soil, and also serves to raise the leaves of the plants being cultivated which may be disposed upon or near the surface of the ground, by its forward upwardly curved edge 22, until they are shed therefrom in position to permit the free passage of the bracket 2.

My invention is particularly advantageous, in that the shield 15 of the blade, is extended upwardly well beyond the plane 25, to which the blade enters the soil, thus permitting a rigid attachment of the bracket, in such position as to not interfere with the soil being worked, yet providing an integral attachment for the blade, and affording sufficient spring or yield between the lower end of said bracket and the curved merger of the shield 15 and wing 17, as to permit said blade to yield when it encounters an unyielding obstruction in its path.

It will be observed that by extending the bracket 2 toward the center of the blade 17, as above described, a free space is afforded for the spreading leaves of the plants being cultivated, and also permits the reversal of the tools or blades with a greater scope of adjustment, for a given slot length, in the carrier, in other words, when the tools are transposed in the carrier, from the position wherein the shields 15 are in juxtaposition, to the reverse wherein the edges 21, of the blade wings, 17 are in juxtaposition, the attaching heads of the respective brackets 2 may be disposed in approximately the same position, but reversed with respect to said carrier, irrespective of the relative positions of said blades, it being understood that with the blades extended more or less, the head may be farther from or nearer to the center as desired.

It will be obvious that the blade so constructed is stiffened to prevent bending, except at the zone local to its plane of entrance into the ground, where a slight yielding may be effected when the blade wing encounters an irresistible object.

Furthermore the curving of the blade in the direction of travel, greatly assists the free passage of said blade through the soil, and consequently the free smooth passage of the loosened soil over the blade.

It may be here noted that in brackets of the type contemplated, it is common practice to provide the head with a rib extended into the slot in the support, and arranged to bear upon the walls thereof, thus tending to pry said slot open and otherwise distort the frame of the support. On the contrary the lug or lip 6, forming the shoulder abutting against the forward edge of the bracket supporting frame 7, provides such an abutment as will afford great rigidity and sustain the thrust incident to the blade passing through the soil, in the direction of the point or nose 16, without tending to distort the frame, whereby said frame may be materially lightened.

I do not desire to limit my invention to the precise details of construction and arrangement as herein set forth, as it is obvious that various modifications may be made therein without departing from the essential features of my invention as defined in the appended claims.

Having thus described my invention, I claim:—

1. A cultivator tool adapted to be adjustably carried by a slotted frame, and having a blade comprising an upper inclined portion curving under and merging into a substantially horizontal wing curving rearwardly upward and extending obliquely backward, and a bracket for said blade secured thereto above the ground plane and extending obliquely substantially in alinement with said upper portion, and having means affording laterally adjustable connection with said frame, said bracket having a lug arranged to bear against the forward edge of the frame.

2. A cultivator tool adapted to be adjustably carried by a suitable slotted frame, and comprising a soil working member, a bracket secured to said soil working member, and provided with an abutment, and means to adjustably engage said bracket to said frame with the abutment bearing against the forward edge of said frame.

3. A cultivator tool comprising a bracket depending obliquely in a lateral plane, and a blade having its upper end integrally connected with said bracket wholly above the ground plane, and curving under in said lateral plane, beneath said bracket, and merging into a horizontally disposed wing extending backwardly, tapering toward its free edge, and curving rearwardly upward in its plane of travel.

4. A cultivator tool comprising a laterally braced bracket, integrally connected above the ground plane with a blade having a leaf shield and a horizontally disposed ground working wing, respectively curved to substantially conform to the surfaces of angularly intersecting cylinders.

5. A cultivator tool adapted to be carried by a slotted frame, and comprising a bracket having a seat arranged to engage the bottom of said frame, and an abutment arranged to engage the forward edge of said frame, and a bolt arranged to extend through said slot in the frame, and adjustably engage said bracket with said frame.

In witness whereof I have hereunto set my hand this 11th day of February, A. D. 1918.

SAMUEL L. ALLEN.

Witnesses:
GLADYS A. BANDY,
R. V. WATERS.

Copies of this patent may be obtained for five cents each, by addressing the "Commissioner of Patents, Washington, D. C."